Figure 1:
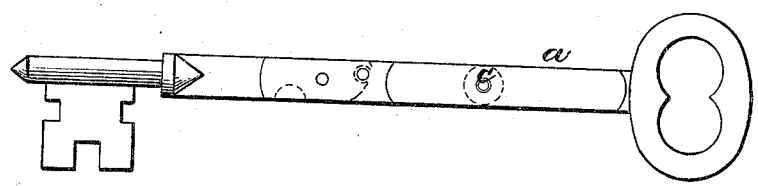

E. Parker
Key.
N₀ 97,547.    Patented Dec. 7, 1869.

Witnesses:

Inventor:
Emery Parker

United States Patent Office.

EMERY PARKER, OF NEW BRITAIN, CONNECTICUT.

Letters Patent No. 97,547, dated December 7, 1869.

IMPROVED SHEET-METAL KEY.

The Schedule referred to in these Letters Patent and making part of the same.

To all whom it may concern:

Be it known that I, EMERY PARKER, of New Britain, in the county of Hartford, and State of Connecticut, have invented a certain new and useful Improvement in the Manufacture of Sheet-Metal Keys; and I do hereby declare that the following specification, taken in connection with the drawings making a part of the same, is a full, clear, and exact description thereof.

The key shown in the drawings, except in the particulars to which the present improvement relates, is the same as that shown and described in the Letters Patent granted to me, dated May 11, 1869.

Keys of the character of which the one above referred to is a type, although much preferred on account of their many obvious advantages over the heavy cast-metal keys whose place they supply, are liable to the objection that the shank is unable to resist the torsional strain incident to throwing a heavy bolt.

Figure 2:
Figure 3:
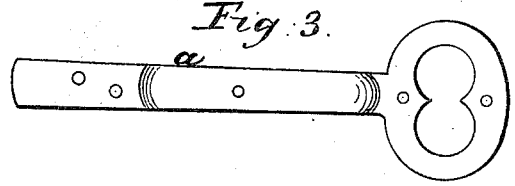

To stiffen the shanks of keys made from sheet-metal is the object of the present improvement, and this I accomplish by giving the parts $a$ and $b$, of which the shank is composed, as seen at Figures 2 and 3, a convex external and concave inner surface; or corrugations may be made, several in number, parallel with each other, and with the longitudinal axis of the blank; or a single corrugation may be used.

Each half of the shank has the proper form imparted to it by means of a blow given to it while between the suitably-formed dies of a lever or other press, in a way well understood among mechanics.

For the purpose of further stiffening the shank, I also introduce, between the walls $a$ and $b$ of the shank, one or more braces, $c$, which may be circular or other-shaped pieces of metal, in thickness equal to the space between the walls, and secured by a rivet-pin passing through both the walls and the brace.

In all other respects, the key shown in the drawings is made as described in the Letters Patent before referred to.

What I claim as my invention, and desire to secure by Letters Patent, is—

1. Making that part of the jointed shank of a sheet-metal key into which the part holding the key proper folds, corrugated or arched in the line of its axis, substantially as described, for the purposes specified.

2. Making the split shank of a sheet-metal key with an intermediate transverse brace, $c$, corresponding in form to the curvature of the sides, substantially as described, for the purposes specified.

EMERY PARKER.

Witnesses:
   M. J. WOODRUFF,
   H. E. RUSSELL, 2d.